(12) United States Patent
Ozawa

(10) Patent No.: US 6,624,820 B2
(45) Date of Patent: Sep. 23, 2003

(54) GRAPHIC PROCESSING METHOD FOR DETERMINING REPRESENTATIVE TEXTURE DATA FOR A PLURALITY OF PIXELS AND APPARATUS FOR SAME

(75) Inventor: Hiroyuki Ozawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/293,575

(22) Filed: Apr. 16, 1999

(65) Prior Publication Data

US 2002/0149579 A1 Oct. 17, 2002

(30) Foreign Application Priority Data

Apr. 21, 1998 (JP) ............................................. 10-111090

(51) Int. Cl.$^7$ ................................................. G09G 5/00
(52) U.S. Cl. ........................ 345/582; 345/587; 345/619
(58) Field of Search ................................ 345/430, 422, 345/419, 418, 425, 441, 426, 431, 501, 506, 522, 552, 433, 435, 505, 509, 428, 423, 503, 427, 502, 515, 521, 581, 582, 587, 592, 600, 606, 619

(56) References Cited

U.S. PATENT DOCUMENTS 5,179,638 A * 1/1993 Dawson et al. ............. 395/125
5,831,624 A * 11/1998 Tarolli et al. ................ 345/430
6,005,583 A * 12/1999 Morrison ..................... 345/430
6,108,460 A * 8/2000 Rich ............................ 345/418

* cited by examiner

Primary Examiner—Mano Padmanabhan
(74) Attorney, Agent, or Firm—Fulwider Patton Lee & Utecht, LLP

(57) ABSTRACT

A graphic processing apparatus which can provide a high quality picture with a small hardware configuration, comprising a DRAM for storing a plurality of texture data corresponding to different reducing rates, a representative point determining circuit for determining a pixel as a representative point from among pixels positioned inside a unit graphic to be processed among a plurality of pixels simultaneously processed, a reducing rate calculation circuit for determining a reducing rate from the homogeneous coordinates and a homogeneous term corresponding to the determined representative point, and a texture data reading circuit for reading from the DRAM the texture data specified by the determined reducing rate, homogeneous coordinates, and homogeneous term for a plurality of the pixels simultaneously processed.

19 Claims, 12 Drawing Sheets

FIG.5A

| 11 | 12 | 13 | 14 |
| 15 | 16 | 17 | 18 |

A (with arrow pointing into cell between 12 and 13)

| 0 | 0 | 0 | 1 |
| 0 | 0 | 0 | 0 |

FIG.5C

| 0 | 0 | 0 | 0 |
| 0 | 1 | 1 | 0 |

FIG.5D

| 0 | 0 | 1 | 0 |
| 0 | 0 | 1 | 0 |

FIG.5E

| 0 | 1 | 1 | 0 |
| 0 | 1 | 1 | 0 |

GRAPHIC PROCESSING METHOD FOR DETERMINING REPRESENTATIVE TEXTURE DATA FOR A PLURALITY OF PIXELS AND APPARATUS FOR SAME

BACKGROUND OF THE INVENTION

1. Field of the Invention

The present invention relates to a graphic processing apparatus which can provide a high quality image and a method thereof.

2. Description of the Related Art

Computer graphics are often used in a variety of computer aided design (CAD) systems and amusement machines. Especially, along with the recent advances in image processing techniques, systems using three-dimensional computer graphics are becoming rapidly widespread.

In three-dimensional computer graphics, the color value of each pixel is calculated at the time of deciding the color of each corresponding pixel. Then, rendering is performed for writing the calculated value to an address of a display buffer (frame buffer) corresponding to the pixel.

One of the rendering methods is polygon rendering. In this method, a three-dimensional model is expressed as an composite of triangular unit graphics (polygons). By drawing the polygons as units, the colors of the pixels of the display screen are decided.

In polygon rendering, coordinates (x, y, z), color data (R, G, B), homogeneous coordinates (s, t) of texture data indicating a composite image pattern and values of a homogeneous term g for the inside of a triangle are found by interpolation from the vertexes of a triangle in a physical coordinate system.

Here, the homogeneous term q is, simply stated, like an expansion or reduction rate. Coordinates in a UV coordinate system of an actual texture buffer, namely, texture coordinate data (u, v), are in accordance with the homogeneous coordinates (s, t) divided by the homogeneous term q to give (s/q, t/q)=(u, v) which in turn are multiplied by texture sizes USIZE and VSIZE, respectively.

In a three-dimensional computer graphic system using such polygon rendering, the texture data is read from the texture buffer when drawing, and texture mapping is performed for applying the read texture data on the surface of the three-dimensional model to obtain image data of a high degree of reality.

Note that when texture mapping is performed on a three-dimensional model, the expansion/reduction rate of the image indicated by the texture data to be applied to each pixel changes.

To perform the texture mapping, as a method for obtaining a high quality picture, there is the MIP MAP (texture for a plurality of resolutions) filtering method.

In the MIPMAP filtering, as shown in FIG. 9, a plurality of already filtered texture data 200, 201, 202, and 203 corresponding to a plurality of different reducing rates are prepared in advance. By selecting texture data 205 corresponding to a reducing rate 204 of the respective pixels, the most suitable texture data 206 for the reducing rate 204 is used and the aliasing effect caused by loss of data accompanying the reduction of an image is suppressed.

Below, a texture mapping apparatus in a case of MIPMAP filtering will be explained.

FIG. 10 is a view for explaining a texture mapping apparatus 210 and FIG. 11 is a flow chart of the processing in the texture mapping apparatus 210.

Step S1: First, the texture mapping apparatus 210 receives as input data $(s_1, t_1, q_1)$, $(s_2, t_2, q_2)$, and $(s_3, t_3, q_3)$ indicating homogeneous coordinates and homogeneous terms of the vertexes of a triangle.

Step S2: Next, the texture mapping apparatus. 210 performs linear interpolation on the data $(s_1, t_1, q_1)$, $(s_2, t_2, q_2)$, and $(S_3, t_3, q_3)$ to obtain the data (s, t, q) indicating homogeneous coordinates and homogeneous terms of the pixels inside the triangle.

Step S3: In the texture mapping apparatus 210, a built-in reducing rate calculation apparatus 212 calculates reducing rates "lod" of the pixels from the (s, t, q) data of the pixels inside the triangle.

Step S4: The texture mapping apparatus 210 calculates the texture coordinate data (u, v) by calculating u data obtained by dividing the s data by the q data and the v data obtained by dividing the t data by the q data for the (s, t, q) data of the pixels.

Next, the texture mapping apparatus 210 calculates the texture address (U, V) as a physical address in the texture buffer 211 from the reducing rate "lod" obtained in the reducing rate calculation apparatus and the texture coordinate data (u, v).

Step S5: The texture mapping apparatus 210 outputs the texture address (U, V) to the texture buffer 211 and reads the texture data (R, G, B).

Step S6: The texture mapping apparatus 210 performs predetermined processing on the texture data read at Step S5 to obtain the pixel data S210 and writes the pixel data S210 in the display buffer 213.

As a result, the texture data corresponding to the reducing rate "lod" among a plurality of texture data corresponding to a plurality of different reducing rates stored in the texture buffer 211 can be accessed.

To realize drawing at a high speed, there is a high speed texture mapping apparatus which performs texture mapping on a plurality of pixels in parallel and writes the pixel data in the display buffer simultaneously.

In this high speed texture mapping apparatus, as shown in FIG. 12, the data $(s_1, t_1, q_1)$, $(S_2, t_2, q_2)$, and $(s_3, t_3, q_3)$ of the vertexes of the triangle are processed in parallel in n number of texture mapping apparatuses $210_1$ to $210_n$. The results of the processing, that is, the pixel data $S210_1$ to $S210_n$, are written in the display buffer simultaneously.

Namely, texture mapping is performed in parallel (simultaneously) on a plurality of pixels.

Note that the texture mapping is performed for a triangle as a unit graphic and that processing conditions such as the reducing rate of the texture data are determined for triangles as units. Among the plurality of pixels simultaneously processed, only the results of the processing for the pixels positioned inside the triangle are valid, while the results of the processing on the pixels outside the triangle are invalid.

Summarizing the problems to be solved by the invention, the calculation to obtain the reducing rate "lod" includes many multiplication operations and division operations, so an enormous amount of calculation is required.

Therefore, as shown in FIG. 12, if the reducing rate calculation apparatuses $212_1$ to $212_n$ are built in the respective n number of texture mapping apparatuses $210_1$ to $210_n$, though it is possible to realize high speed processing, there is a disadvantage that the apparatus becomes large in size.

In order to overcome the disadvantage, a method may be considered of building the reducing rate calculation apparatus in only one texture mapping apparatus among a plurality of texture mapping apparatuses performing the parallel processing, making a pixel processed by the texture mapping apparatus a representative point in obtaining the reducing rate, and using the reducing rate obtained in the reducing rate calculation apparatus in all of the texture mapping apparatuses.

In this case, the position of the pixel serving as the representative point among the plurality of pixels simultaneously processed becomes fixed.

Accordingly, there is a possibility that a pixel positioned outside of the unit graphic, that is, triangle, will becomes the representative point among the plurality of pixels simultaneously processed.

Since the reducing rates largely differ between inside and the outside of the triangle, if a pixel outside the triangle processed becomes the representative point, the most suitable texture data cannot be selected for the pixels inside the triangle. As a result, there is a disadvantage that the picture quality will be considerably degraded.

SUMMARY OF THE INVENTION

An object of the present invention is to provide a graphic processing apparatus which can stably provide a high quality picture with a small hardware configuration and a method thereof.

According to a first aspect of the present invention, there is provided a graphic processing apparatus for expressing a three-dimensional model by a composite of a plurality of unit graphics to which common processing conditions are applied, determining a reducing rate from homogeneous coordinates (s,t) and a homogeneous term q included in image data for each pixel, and establishing correspondence between texture data in accordance with the determined reducing rate and the unit graphics, comprising a storage means for storing a plurality of texture data corresponding to different reducing rates; a representative point determining means for determining a pixel as a representative point among pixels positioned inside a unit graphic to be processed among a plurality of pixels simultaneously processed; a reducing rate determining means for determining a reducing rate by using the homogeneous coordinates (s,t) and the homogeneous term corresponding to the determined representative point; and a reading means for reading from the storage means the texture data specified by the determined reducing rate, the homogeneous coordinates (s,t), and the homogeneous term q for each of the plurality of pixels simultaneously processed.

Preferably, only the results of processing for pixels positioned inside the unit graphic to be processed among the plurality of pixels simultaneously processed are used as valid.

Preferably, when there are a plurality of pixels positioned inside the unit graphic to be processed among the plurality of pixels simultaneously processed, the pixel closest to the center of a region defined by the plurality of pixels simultaneously processed among the plurality of pixels positioned inside the unit graphic is determined as the representative point.

Preferably, the reading means reads the texture data corresponding to a pixel from a physical address determined by a reference address in a storage region of the storage means in accordance with the determined reducing rate and a texture address in accordance with the homogeneous coordinates (s,t) and the homogeneous term q.

That is, in the graphic processing apparatus of the first aspect of the present invention, the representative point determining means determines a representative point first from among the pixels inside the unit graphic to be processed in a plurality of pixels simultaneously processed.

Next, the reducing rate calculation means determines the reducing rate from the homogeneous coordinates (s, t) and the homogeneous term q corresponding to the determined representative point.

Next, the reading means reads the texture data specified by the determined reducing rate, homogeneous coordinates (s, t), and homogeneous term q for the pixels to be simultaneously processed from the memory means.

According to a second aspect of the present invention, there is provided a graphic processing apparatus for expressing a three-dimensional model by a composite of a plurality of unit graphics to which common processing conditions are applied and establishing correspondence of texture data showing an image with the unit graphics, comprising a storage means for storing a plurality of texture data corresponding to different reducing rates; a polygon rendering data generating means for generating polygon rendering data including three-dimensional coordinates (x, y, z), red (R) data, green (G) data, blue (B) data, homogeneous coordinates (s,t), and a homogeneous term q for each of the vertexes of the unit graphics; a data interpolation means for performing interpolation on the polygon rendering data of the vertexes of a unit graphic to generate image data of a pixel positioned inside the unit graphic; and a texture processing means for determining a reducing rate by using the homogeneous coordinates (s,t) and homogeneous term q and establishing correspondence between the texture data in accordance with the determined reducing rate and the unit graphics, the texture processing means comprising a representative point determining means for determining a pixel as a representative point among pixels positioned inside a unit graphic to be processed among a plurality of pixels simultaneously processed; a reducing rate determining means for determining a reducing rate by using the homogeneous coordinates (s,t) and the homogeneous term q corresponding to the determined representative point; and a reading means for reading from the storage means the texture data specified by the determined reducing rate, the homogeneous coordinates (s,t), and the homogeneous term q for each of the plurality of pixels simultaneously processed.

Preferably, the apparatus further comprises a pixel position judging means for judging if each of a plurality of pixels simultaneously processed is positioned inside the unit graphic and generating valid bit data in accordance with the result of the judgment, wherein the representative point determining means of the texture processing measis detenninca the pixel to be the representative point by using the valid hit data.

Preferably, the storage means further stores display data in accordance with the texture data read out by the texture processing means.

That is, in the graphic processing apparatus of the second aspect of the present invention, the polygon rendering data generation means generates the polygon rendering data including the three-dimensional coordinates (x, y, z), R (red), G (green), B (blue) data, the homogeneous coordinates (s, t), and the homogeneous term q for the vertexes of the unit graphic.

Next, the data interpolation means generates the image data of the pixels inside the unit graphic by interpolation from the polygon rendering data of the vertexes of the unit graphic.

Next, the texture processing means determines the reducing rate from the homogeneous coordinates (s, t) and the homogeneous term q included in the image data of the respective pixels and establishes correspondence of texture data in accordance with the determined reducing rate with the unit graphics.

Here, in the texture processing means, the representative point determining unit determines a pixel to be the representative point from among the pixels inside the unit graphic in the pixels simultaneously processed. Next, the reducing rate determining unit determines the reducing rate from the homogeneous coordinates (x, y) and the homogeneous term q corresponding to the determined representative point. Next, the reading unit reads from the memory means the texture data specified by the determined reducing rate, homogeneous coordinates (s, t), and homogeneous term q for the pixels simultaneously processed.

According to a third aspect of the present invention, there is provided a graphic processing apparatus for expressing a predetermined shape to be displayed on a display by a combination of unit graphics by simultaneously performing operations for a plurality of pixels and performing processing using as valid only the results of operations on pixels positioned inside a unit graphic to be processed, comprising a polygon rendering data generating apparatus for generating polygon rendering data including three-dimensional coordinates (x, y, z), red (R) data, green (G) data, and blue (B) data, homogeneous coordinates (s,t), and a homogeneous term q for each vertex of the unit graphic; a rendering apparatus for performing rendering by using the polygon rendering data; and a bus connecting the polygon rendering data generating apparatus and the rendering apparatus; the rendering apparatus comprising a storage means for storing a plurality of texture data corresponding to different reducing rates, a data interpolation means for performing interpolation on polygon rendering data of vertexes of a unit graphic input from the polygon rendering data generating apparatus via the bus to generate image data of a pixel positioned inside the unit graphic, and a texture processing means for determining a reducing rate by using the homogeneous coordinates (s,t) and the homogeneous term q and establishing correspondence of the texture data in accordance with the determined reducing rate with the unit graphics; the texture processing means comprising a representative point determining means for determining a pixel as a representative point among pixels positioned inside a unit graphic to be processed among a plurality of pixels simultaneously processed, a reducing rate determining means for determining a reducing rate by using the homogeneous coordinates (s,t) and the homogeneous term q corresponding to the determined representative point, and a reading means for reading from the storage means the texture data specified by the determined reducing rate, the homogeneous coordinates (s,t), and the homogeneous term q for each of the plurality of pixels simultaneously processed.

According to a fourth aspect of the present invention, there is provided a graphic processing method for expressing a three-dimensional model by a composite of a plurality of unit graphics to which common processing conditions are applied, determining a reducing rate by using homogeneous coordinates (s,t) and a homogeneous term q included in image data for each pixel, and establishing correspondence of texture data in accordance with the determined reducing rate with the unit graphics, comprising the steps of determining a pixel as a representative point among pixels positioned inside a unit graphic to be processed among a plurality of pixels simultaneously processed; determining a reducing rate from the homogeneous coordinates (s,t) and the homogeneous term q corresponding to the determined representative point; and selecting texture data specified by the determined reducing rate, the homogeneous coordinates (s,t), and the homogeneous term q among a plurality of texture data corresponding to different reducing rates prepared in advance and establishing correspondence of the selected texture data with each of the plurality of pixels simultaneously processed.

According to a fifth aspect of the present invention, there is provided a graphic processing method for expressing a three-dimensional model by a composite of a plurality of unit graphics to which common processing conditions are applied and establishing correspondence of texture data indicating image with the unit graphics, comprising the steps of generating polygon rendering data including three-dimensional coordinates (x, y, z), red (R) data, green (G) data, and blue (B) data, homogeneous coordinates (s,t) and a homogeneous term q for each vertex of the unit graphics; performing interpolation on the polygon rendering data of the vertexes of a unit graphic to generate image data of a pixel positioned inside the unit graphic; determining a pixel as a representative point among pixels positioned inside a unit graphic to be processed among a plurality of pixels simultaneously processed; determining a reducing rate from the homogeneous coordinates (s,t) and the homogeneous term g corresponding to the determined representative point; and selecting texture data specified by the determined reducing rate, the homogeneous coordinates (s,t), and the homogeneous term q among a plurality of texture data corresponding to different reducing rates prepared in advance and establishing correspondence of the selected texture data with each of the plurality of pixels simultaneously processed.

BRIEF DESCRIPTION OF THE DRAWINGS

These and other objects and features of the present invention will become clearer from the following description of the preferred embodiments given with reference to the accompanying drawings, in which:

FIG. 5 is a view for explaining the processing in the representative point determining circuit shown in FIG. 3;

DESCRIPTION OF THE PREFERRED EMBODIMENTS

Below, a preferred embodiment will be described with reference to the accompanying drawings.

In this embodiment, a case of applying the present invention to a three-dimensional computer graphic system which displays a desired three-dimensional image of any three-dimensional object model on a display such as a cathode ray tube (CRT) at a high speed, which is often used for home game machines, will be explained.

Figure 1:
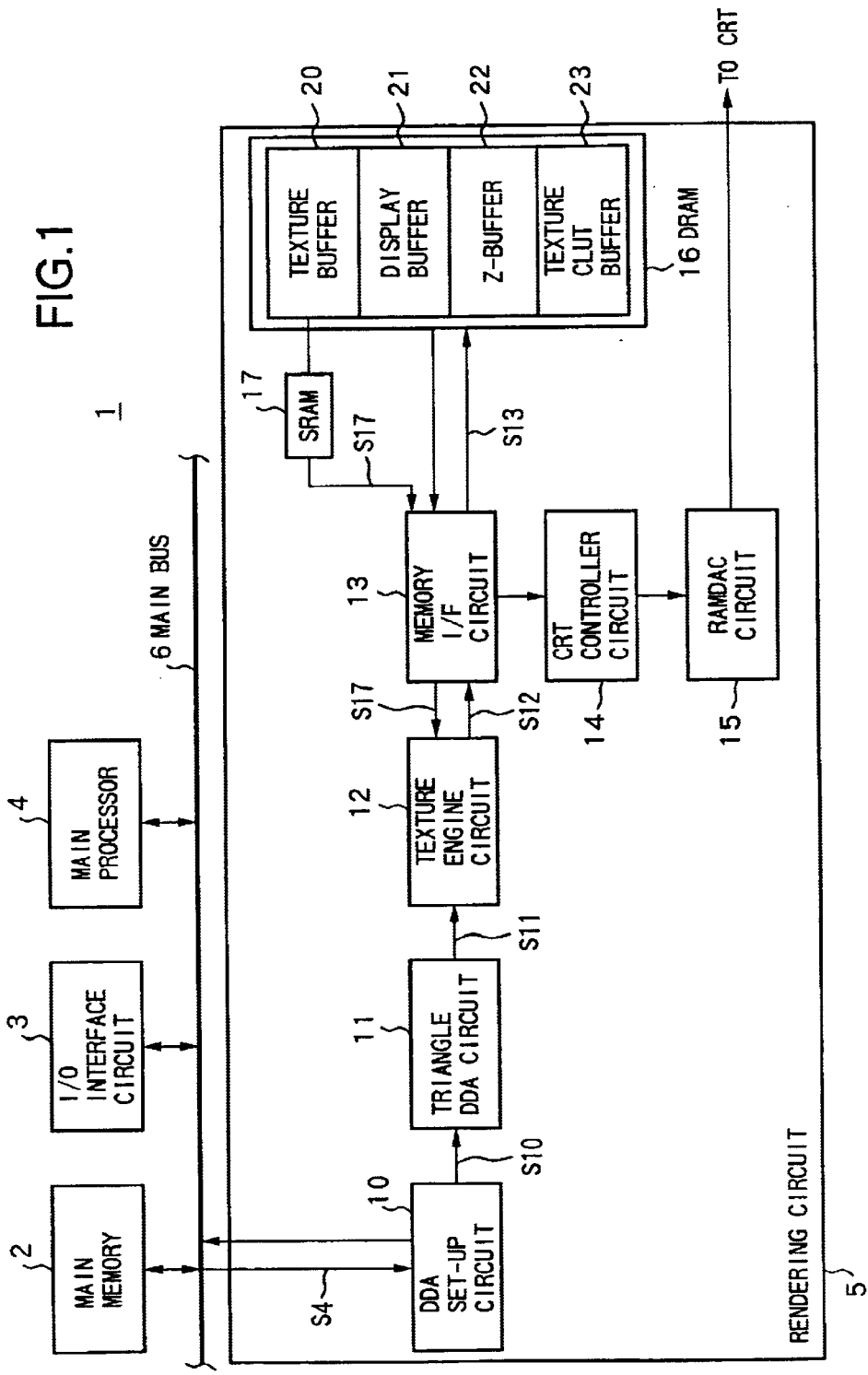
FIG. 1 is a view of the system configuration of a three-dimensional computer graphic system according to a first embodiment of the present invention.

FIG. 1 is a view of the system configuration of a three-dimensional computer graphic system 1 of the present embodiment.

In the three-dimensional computer graphic system 1, a three-dimensional model is expressed by a composite of triangular unit graphics (polygons). By drawing the polygons, this system can decide the color of each pixel on the display screen and perform polygon rendering for display on the screen.

In the three-dimensional computer graphic system 1, a three-dimensional object is expressed by using a z-coordinate for indicating the depth in addition to the (x, y) coordinates for indicating positions on a two-dimensional plane. Any point in the three-dimensional space can be expressed by the three coordinates (x, y, z).

As shown in FIG. 1, the three-dimensional computer graphic system 1 comprises a main memory 2, an I/O interface circuit 3, a main processor 4, and a rendering circuit 5 connected via a main bus 6.

Below, the operations of the components will be explained.

The main processor 4, for example, in accordance with the state of progress in a game, reads the necessary graphic data from the main memory 2, performs clipping, lighting, geometrical processing, etc. on the graphic data, and generates polygon rendering data. The main processor 4 outputs the polygon rendering data S4 to the rendering circuit 5 via the main bus 6.

The I/O interface 3 receives as input polygon rendering data from the outside in accordance with need and outputs the same to the rendering circuit via the main bus 6.

Here, the polygon rendering data includes data of each of the three vertexes (x, y, z, R, G, B, $\alpha$, s, t, q, F) of the polygon.

Here, the (x, y, z) data indicates the three-dimensional coordinates of a vertex of the polygon, and (R, G, B) data indicates the luminance values of red, green, and blue at the three-dimensional coordinates, respectively.

The data $\alpha$ indicates a coefficient of blending the R, G, B data of a pixel to be drawn and that of a pixel already stored in the display buffer 21.

Among the (s, t, q) data, the (s, t) indicates homogeneous coordinates of a corresponding texture and the q indicates the homogeneous term. Here, the texture size USIZE and VSIZE are respectively multiplied with the "s/q" and "t/q" to obtain coordinate data (u, v) of the texture. The texture coordinate data (u, v) is used for accessing the texture data stored in the texture buffer 20.

The F data indicates an $\alpha$ value of fogging.

Namely, the polygon rendering data indicates physical coordinate values of the vertexes of a triangle and values of colors of the vertexes, texture, and fogging.

The rendering circuit 5 will be explained in detail below.

As shown in FIG. 1, the rendering circuit 5 comprises a digital differential analyzer (DDA) set-up circuit 10, a triangle DDA circuit 11, a texture engine circuit 12, a memory interface (I/F) circuit 13, a cathode ray tube (CRT) controller circuit 14, a random access memory (RAM) DAC circuit 15, a dynamic random access memory (DRAM) 16, and a static random access memory (SRAM) 17.

The DRAM 16 functions as a texture buffer 20, a display buffer 21, a z-buffer 22, and a texture CLUT buffer 23.

DDA Set-up Circuit 10

The DDA set-up circuit 10 performs linear interpolation on the values of the vertexes of the triangle on the physical coordinates in a triangle DDA circuit 11 in its latter part. The DDA set-up circuit 10, prior to obtaining information of the color and depth of the respective pixels inside the triangle, performs a set-up operation for obtaining the sides of the triangle and the difference in a horizontal direction for the data (z, R, G. B, $\alpha$, s, t, q, F) indicated by the polygon rendering data S4.

Specifically, this set-up operation uses values of the starting point and the ending point and the distance between the two points to calculate the variation of the value to find movement for a unit length.

Namely, the DDA set-up circuit 10 generates dsdx, dtdx and dqdx as variation in the x direction and dsdy, dtdy and dqdy as variation in the y direction of the (s, t, q) data for each pixel.

The DDA set-up circuit 10 outputs the calculated variation data S10 to the triangle DDA circuit 11.

Triangle DDA Circuit 11

The triangle DDA circuit 11 uses the variation data S10 input from the DDA set-up circuit 10 to calculate the (z, R, G, B, $\alpha$, s, t, q, F) data after linear interpolation for each pixel inside the triangle.

Also, the triangle DDA circuit 11 generates one-bit validity bit data $I_1$ to $I_8$ indicating whether or not the pixel is inside the objective triangle for 8 pixels to be processed in parallel. Specifically, the validity bit data $I_1$ to $I_8$ becomes "1" for a pixel inside the triangle and "0" for a pixel outside the triangle.

Figure 2:
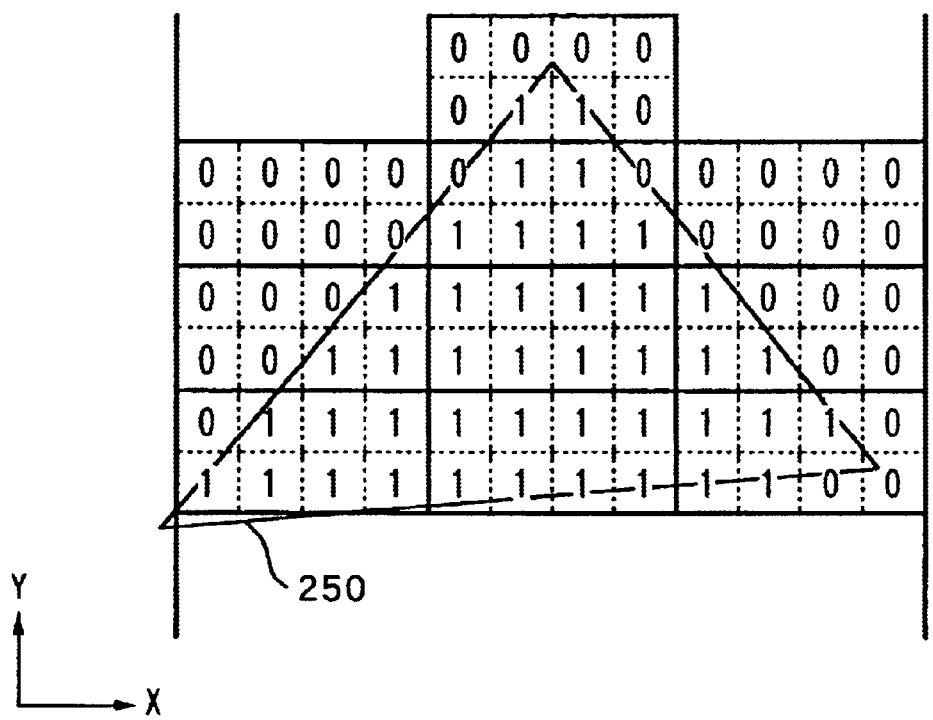
FIG. 2 is a view for explaining the method for generating validity bit data in a DDA set-up circuit shown in FIG. 1.

Specifically, as shown in FIG. 2, the validity bit data $I_1$ to $I_8$ are determined with respect to the triangle 250 positioned on the x, y coordinate system.

Note that the solid line shown in FIG. 2 indicates a block to which 8 pixels (=2×4) to be simultaneously processed belong.

The triangle DDA circuit 11 outputs the data (x, y) for each pixel, the (z, R. G, B, $\alpha$, s, t, q, F) data at the (x, y) coordinates, the validity bit data $I_1$ to $I_8$, dsdx, dtdx, dqdx, dsdy, dtdy and dqdy included in the variation data S10 and USIZE and VSIZE as sizes of width and the height of the texture to the texture engine circuit 12.

In the present embodiment, the triangle DDA circuit 11 outputs the DDA data S11 of 8 (=2×4) pixels positioned inside a block being processed in parallel as units to the texture engine circuit 12.

Texture Engine Circuit 12

The texture engine circuit 12 performs the selection of the reducing rate of the texture data, the calculation of "s/q" and "t/q", calculation of the texture coordinate data (u, v), calculation of (U, V), reading of the data (R, G, B, $\alpha$) from the texture buffer 20, and blending (blending of the texture a) successively, for example, in a pipeline format.

At this time, for example, the selection of the reducing rate of the texture data and the calculation of "s/q" and "t/q" are performed in parallel in some cases.

Note that the texture engine circuit 12 performs the processing on the 8 pixels positioned inside a predetermined block simultaneously in parallel.

Figure 3:
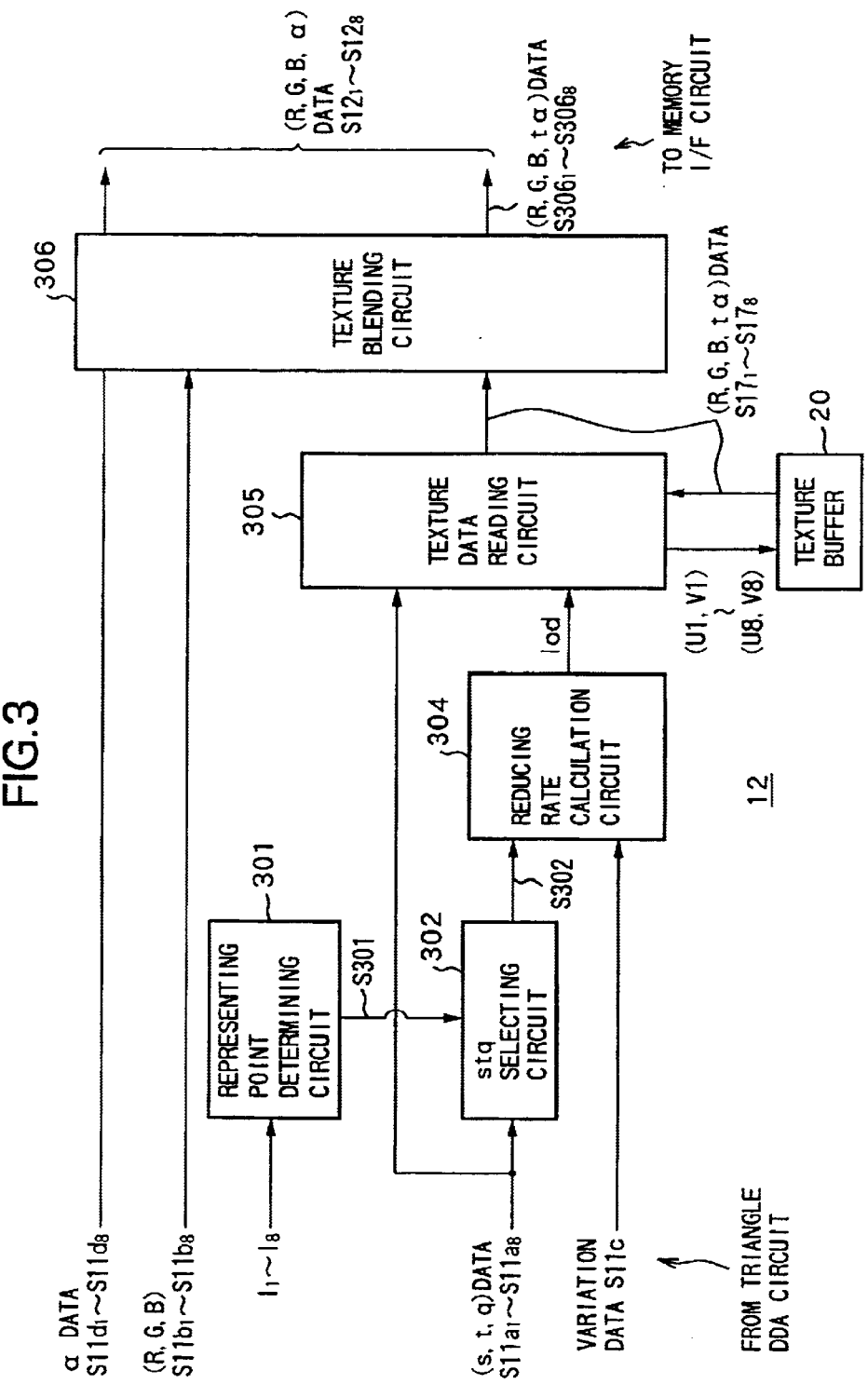
FIG. 3 is a view if the configuration of a texture engine circuit shown in FIG. 1.

FIG. 3 is a view of the configuration of the texture engine circuit 12.

As shown in FIG. 3, the texture engine circuit 12 comprises a representative point determining circuit 301, an stq selecting circuit 302, a reducing rate calculation circuit 304, a texture data reading circuit 305, and a texture blending circuit 306.

Representative Point Determining Circuit 301

The representative point determining circuit 301 determines a pixel to be a representative point from among the validity bit data $I_1$ to $I_8$ included in the DDA data S11 input from the triangle DDA circuit 11 and outputs representative point instruction data S301 indicating the determined representative point to the stq selecting circuit 302.

Specifically, among the pixels inside the objective triangle in the 8 pixels of 2×4 lines to be simultaneously processed, the representative point determining circuit 301 determines a pixel closest to the center of the block as the representative point on the condition that the pixel is inside the triangle to be processed.

Figure 4:
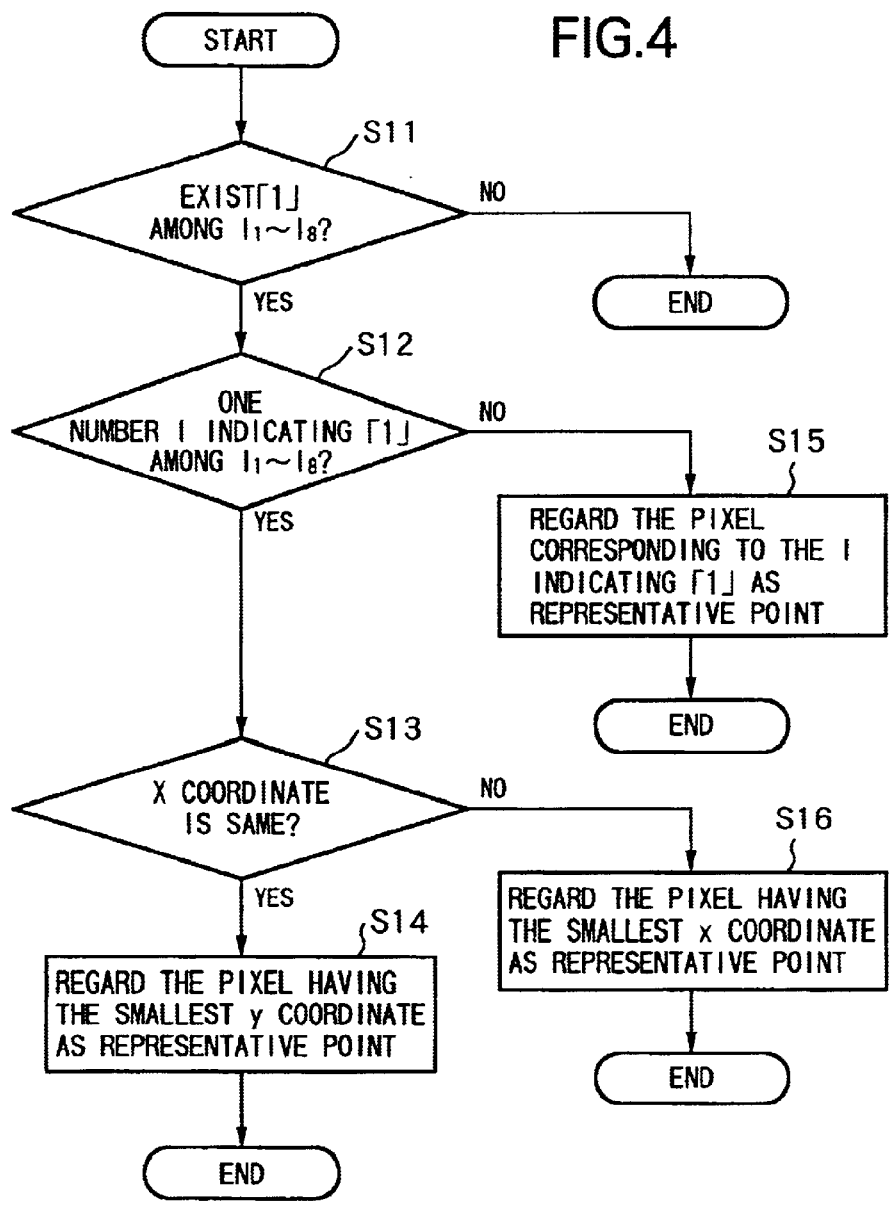
FIG. 4 is a flow chart of the processing in a representative point determining circuit shown in FIG. 3.

FIG. 4 is a flow chart of the representative point determining processing in the representative point determining circuit 301.

Step S11: First, the representative point determining circuit 301 judges whether there is at least one validity bit data indicating "1" in the validity bit data I1 to I8. When there is, the processing at Step S12 is carried out.

Step S12: The representative point determining circuit 301 judges whether or not there is just one validity bit data indicating "1" in the validity bit data I1 to I8. When it is, the processing in Step S15 is carried out. In Step S15, a pixel corresponding to the validity bit data indicating "1" is determined as the representative point.

Step S13: When there are two or more validity bit data indicating "1" in the validity bit data $I_1$ to $I_8$, the representative point determining circuit 301 determines a pixel closest to the center of the block region wherein the pixels simultaneously processed are arranged, as the representative point, from among the pixels corresponding to the validity bit data indicating "1".

At this time, when there are a plurality of pixels closest to the center of the block region, it is judged whether or not their x coordinates are same. When they are different, the processing in the Step S16 is carried out. At Step S16, a pixel having the smallest x coordinate in determined to be the representative point from among the pixels closest to the center of the block.

Step S14: When there are a plurality of pixels closest to the center of the block region and their x coordinates are the same, the representative point determining circuit 301 determines a pixel having the smallest y coordinate to be the representative point among them.

Below, the determination of the representative point in the representative point determining circuit 301 will be explained by a specific example.

FIG. 5 is a view for explaining the determination of a representative point in the representative point determining circuit 301.

The arrangement of the pixels corresponding to the validity bit data $I_1$ to $I_8$ is set as shown in FIG. 5A. Here, the center of the block of the pixels to be simultaneously processed is A.

For example, as shown in FIG. 5B, when only the validity bit data $I_4$ is "1", the representative point determining circuit 301 determines the pixel corresponding to the validity bit data $I_4$ as the representative point.

As shown in FIG. 5C, when the validity bit data $I_6$ and $I_7$ are "1" and pixels corresponding to them have different x coordinates, the pixel corresponding to the validity bit data $I_6$ having the smaller x coordinate is determined as the representative point.

As shown in FIG. 5D, when the validity bit data $I_3$ and $I_7$ are "1" and pixels corresponding to them have the same x coordinates, the pixel corresponding to the validity bit data $I_7$ having the smaller y coordinate is determined as the representative point.

As shown in FIG. 5E, when the validity bit data $I_2$, $I_3$, $I_6$, and $I_7$ are "1", the pixel corresponding to the validity bit data $I_6$ having the smallest x coordinates and y coordinate is determined as the representative point.

Figure 6:
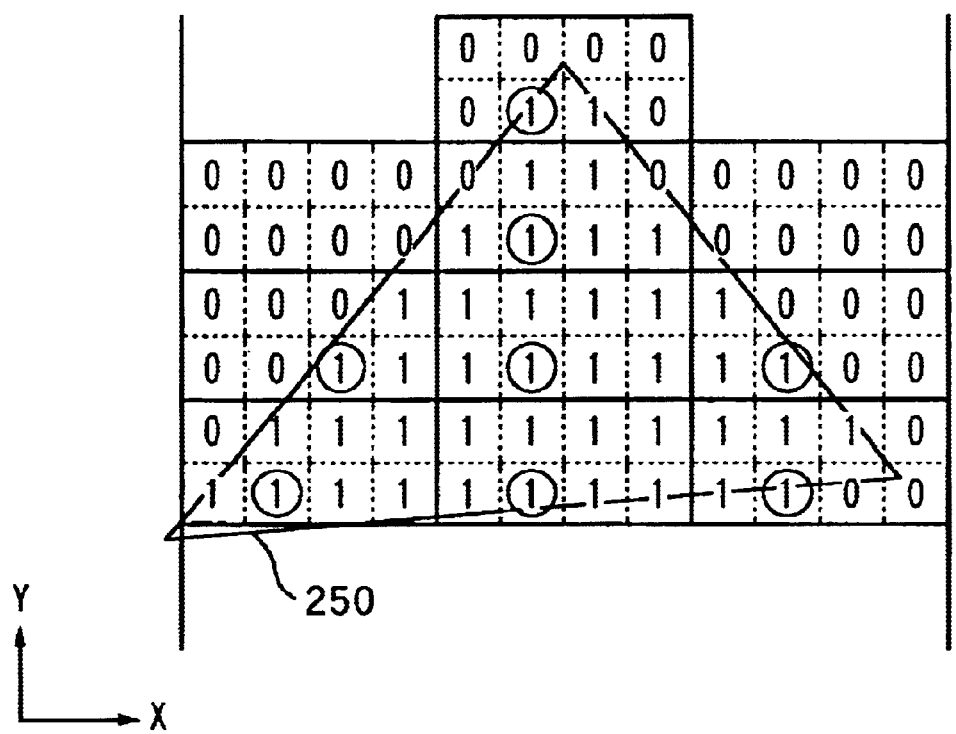
FIG. 6 is a view for explaining a specific example of a representative point when the triangle shown in FIG. 2 is to be processed.

In the triangle 250 shown in FIG. 2, the representative point is determined for 8 pixels as a unit as shown in FIG. 6 based on the algorithm shown in FIG. 4. In FIG. 6, the pixels of circled "1" become the representative points.

stq Selecting Circuit 302

The stq selecting circuit 302 receives as input (s, t, q) data $S11a_1$ to $S11a_8$ for 8 pixels included in the DDA data S11, selects the (s, t, q) data corresponding to the pixel indicated by the representative point instruction data S301, and outputs the same as (s, t, q) data S302 to the reducing rate calculation circuit 304.

The reducing rate calculation circuit 304 uses the (s, t, q) data S302 and the selected data S303 to calculate the reducing rate of the texture data.

Namely, the reducing rate calculation circuit 304 calculates the reducing rate of the pixel determined as the representative point in the representative point determining circuit 301 and outputs the same as the reducing rate "lod" to the texture data reading circuit 305.

Here, the reducing rate indicates how much the texture data of the original image is reduced. When the reducing rate of the original image is 1/1, the reducing rate becomes, 1/2, 1/4, 1/8 . . .

When multiplying the original image by 1/n, the reducing rate "lod" is indicated by the formula (1) below:

$$\text{lod} = \log_2 n \quad (1)$$

Below, the method of calculation of the reducing rate "lod" in the reducing rate calculation circuit 304 will be explained.

The reducing rate calculation circuit 304 uses the input (s, t, q) data S302 and the variation data S11c to perform the operations corresponding to the following formulas (2) to (5) to obtain the dudx, dvdx, dudy, and dvdy data:

$$dudx = (q \times dsdx - s \times dqdx) \times USIZE/q^2 \quad (2)$$

$$dvdx = (q \times dtdx - t \times dqdx) \times VSIZE/q^2 \quad (3)$$

$$dudy = (q \times dsdy - s \times dqdy) \times USIZE/q^2 \quad (4)$$

$$dvdy = (q \times dtdy - t \times dqdy) \times VSIZE/q^2 \quad (5)$$

Next, the dudx, dvdx, dudy, and dvdy data are used and operations performed corresponding to the following formulas (6) and (7) to calculate the ex, ey data:

$$ex = (dudx^2 + dvdx^2)^{1/2} \quad (6)$$

$$ey = (dudy^2 + dvdy^2)^{1/2} \quad (7)$$

Next, the larger data of the ex and ey data is determined as e and used in the calculation of the formula (8) below to obtain the reducing rate "lod":

$$lod = \log_2 e \tag{8}$$

Note that in the calculation of the above formulas (2) to (5), the variation of q is regarded as small enough to be ignored, so this can be approximated as dqdx=dqdy=0.

Figure 7:
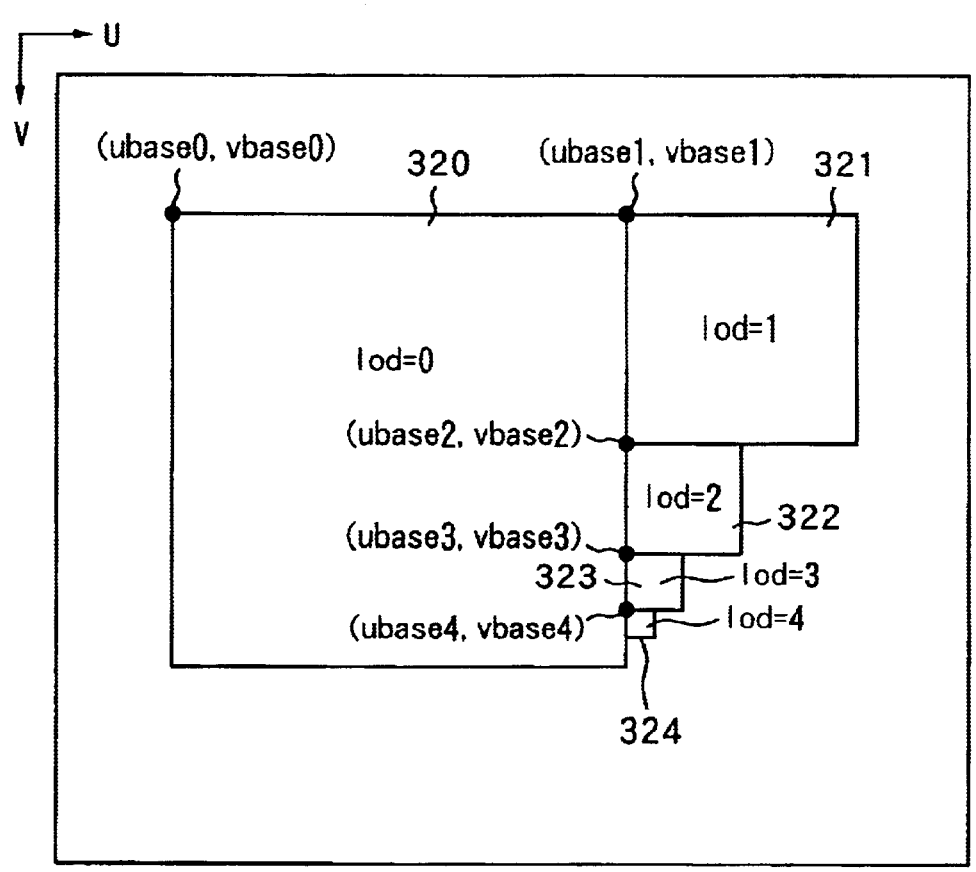
FIG. 7 is a view for explaining an address space in the texture buffer shown in FIG. 3.

Note that the texture buffer 20 stores, for example as shown in FIG. 7, the texture data 320, 321, 322, and 323 of "lod"=0, 1, 2, 3, and 4.

Note that an address space of the memory region of the texture buffer 20 is, as shown in FIG. 7, expressed by the U, V coordinate system. The reference addresses (starting address) of the memory region storing the texture data corresponding to a plurality of reducing rates are calculated based on the reducing rate "lod". In the example shown in FIG. 7, the reference addresses of the texture data 320, 321, 322, and 323 are (ubase$_0$, vbase$_0$,), (ubase$_1$, vbase$_1$), (ubase$_2$, vbase$_2$), and (ubase$_3$, vbase$_3$).

Also, the texture addresses (U, V) for the pixels in the texture data stored in the texture buffer 20 are generated by using the reference addresses (ubase, vbase) and the texture coordinate data (u, v) and from, for example, "U=ubase+u/$2^{lod}$" and "V=vbase+v/$2^{lod}$".

Texture Data Reading Circuit 305

The texture data reading circuit 305 receives as input the (s, t, q) data S11$a_1$ to S11$a_8$ for 8 pixels included in the DDA data S11, the reducing rate "lod" from the reducing rate calculation circuit 304, and the texture sizes USIZE and VSIZE, reads the texture data S17 corresponding to the 8 pixels from the texture buffer 20, and outputs the same to the texture blending circuit 306.

Figure 8:
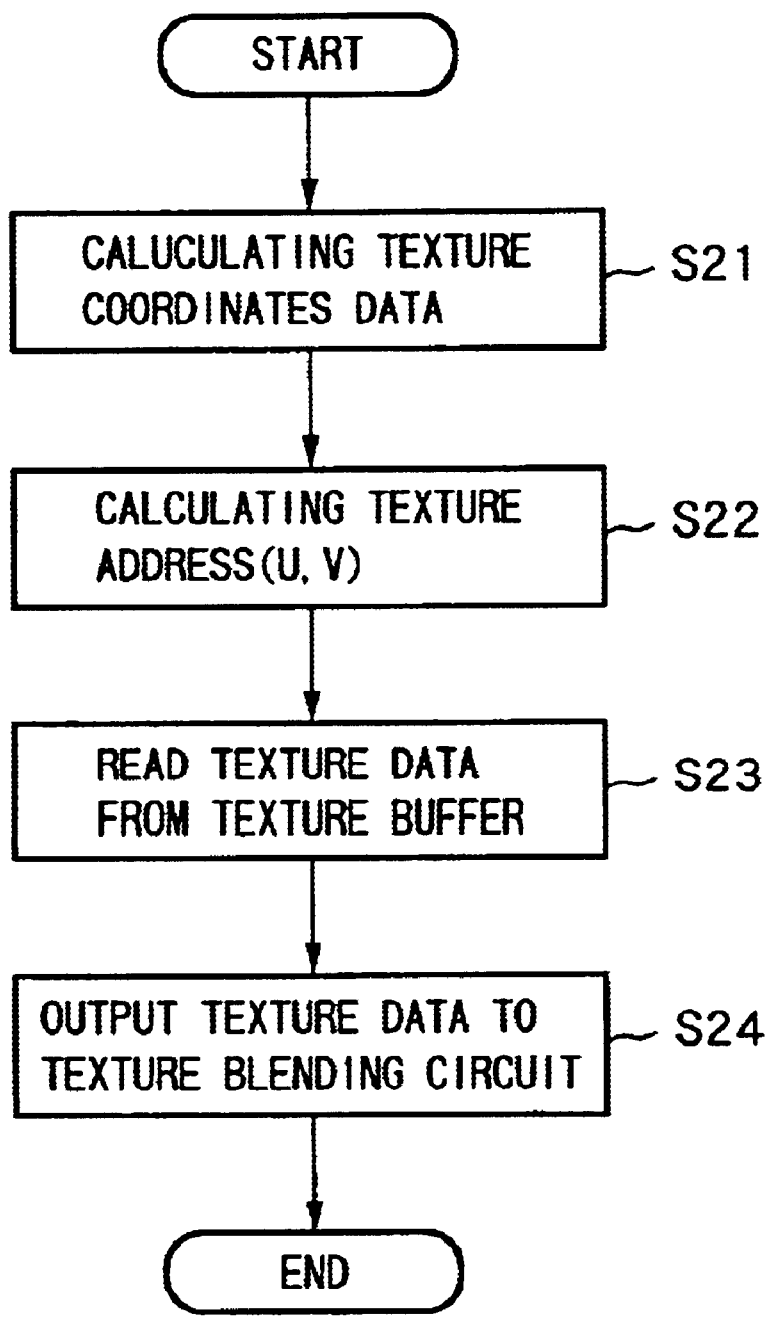
FIG. 8 is a flow chart of the processing in the texture data reading circuit shown in FIG. 3.
Figure 9:
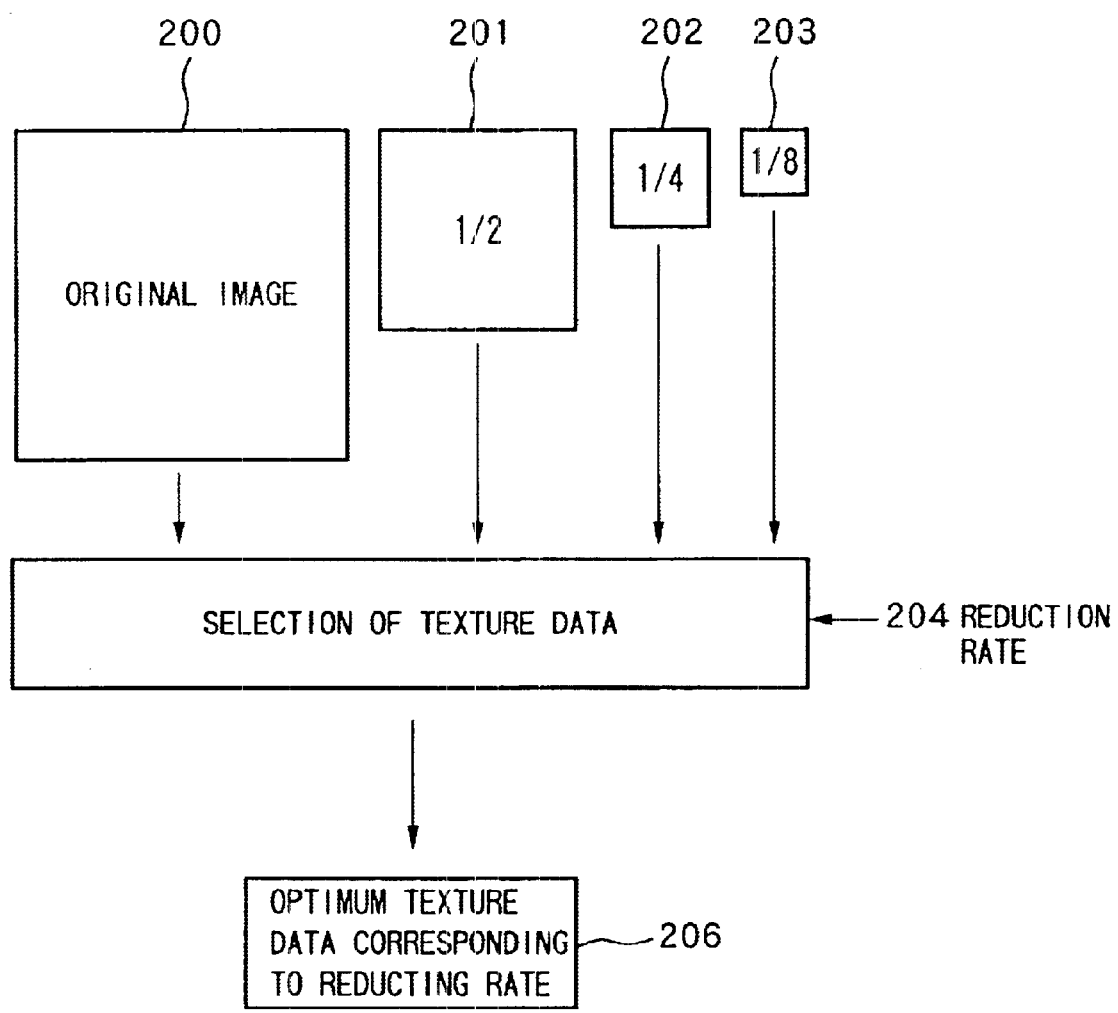
FIG. 9 is a view for explaining MIPMAP filtering.
Figure 10:
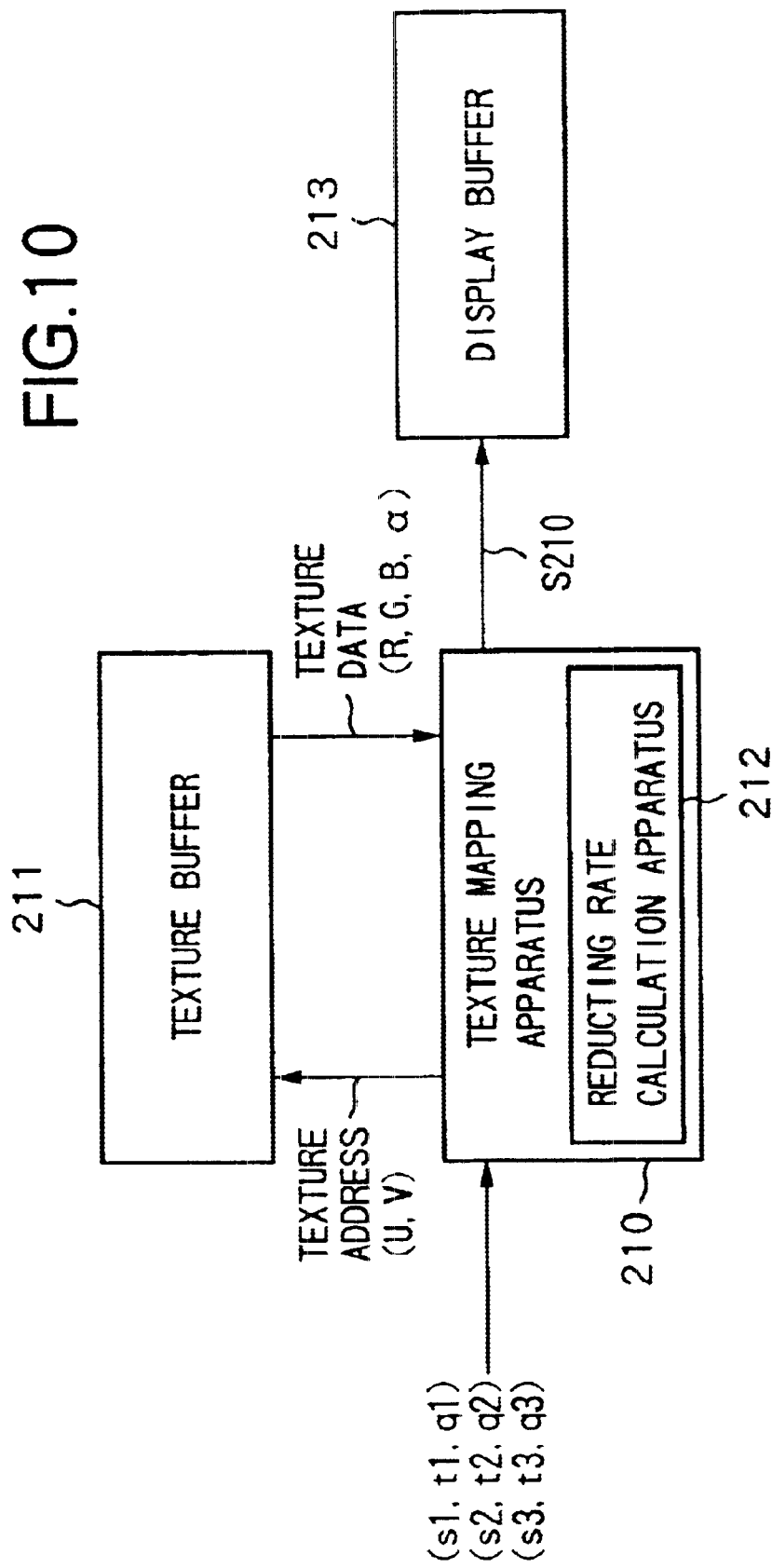
FIG. 10 is a view for explaining a general texture mapping apparatus of the related art.
Figure 11:
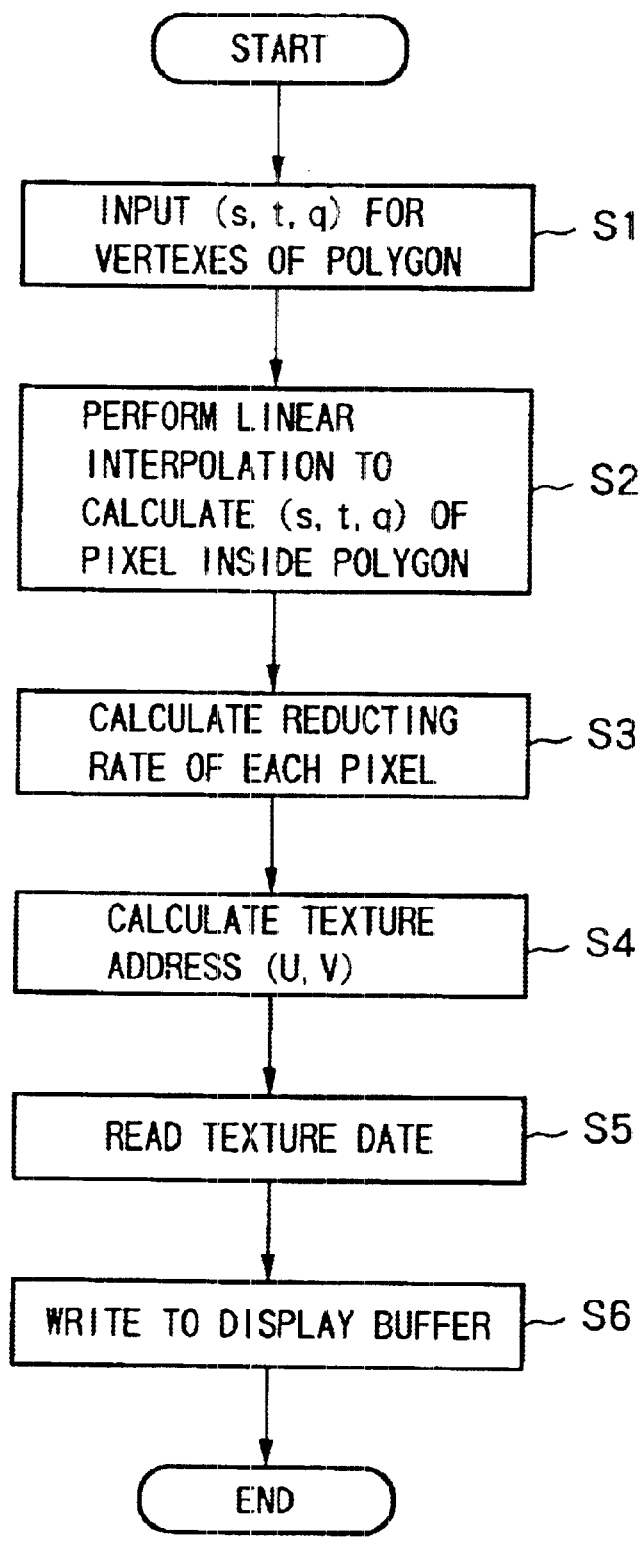
FIG. 11 is a flow chart of the processing in the texture mapping apparatus shown in FIG. 10.
Figure 12:
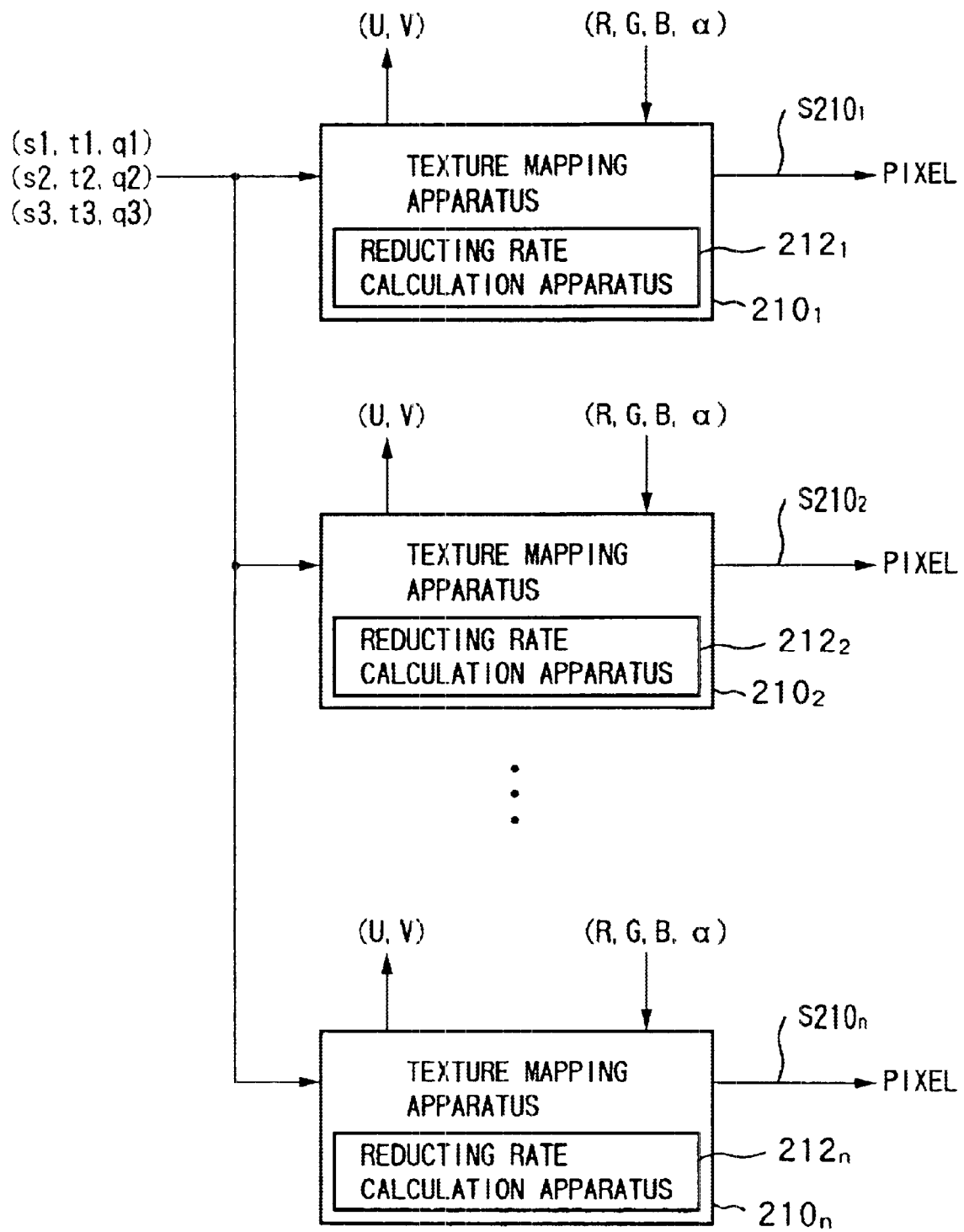
FIG. 12 is a view for explaining the texture mapping apparatus which realizes high speed processing.

FIG. 8 is a flow chart of the processing in the texture data reading circuit 305.

Step S21: The texture data reading circuit 305 performs the operation of dividing the s data by the q data and the operation of dividing the t data by the q data to obtain the result "s/q" and "t/q" for each of the (s, t, q) data S11$a_1$ to S11$a_8$ for 8 pixels.

Then, the texture data reading circuit 305 multiplies the texture sizes USIZE and VSIZE respectively with the results "s/q" and "t/q" to obtain the texture coordinate data ($u_1$, $v_1$) to ($u_8$, $v_8$) corresponding to the respective pixels.

Step S22: The texture data reading circuit 305 obtains the reference address (ubase, vbase) corresponding to the reducing rate "lod", for example, by referring to an address table prepared in advance.

Then, the texture data reading circuit 305 uses the reference address (usize, vsize) and the texture coordinate data ($u_1$, $v_1$) to ($u_8$, $v_8$) obtained in Step S21 to generate the texture addresses ($U_1$, $V_1$) to ($U_8$, $V_8$) of the physical addresses of the texture buffer 20 in the UV coordinate system from, for example, "U =ubase+u/$2^{lod}$" and "V=vbase+v/$2^{lod}$".

Step S23: The texture data reading circuit 305 outputs the texture addresses ($U_1$, $V_1$) to ($U_8$, $V_8$) generated at Step S22 to the texture buffer 20 via the memory I/F circuit 13 shown in FIG. 1 and reads the texture data (R, G, B, tα) S17$_1$ to S17$_8$.

Here "tα" indicates a coefficient of the texture blending.

Note that the SRAM 17 stores a copy of the texture data stored in the texture buffer 20. The texture engine circuit 12 actually reads the texture data stored in the SRAM 17 via the memory I/F circuit 13.

Step S24: The texture data reading circuit 305 outputs the (R, G, B, tα) data S17$_1$ to S17$_8$ read at Step S23 to the texture blending circuit 306.

Texture Blending Circuit 306

The texture blending circuit 306 multiplies the (R, G, B, α) data S11$b_1$ to S11$b_8$ for the 8 pixels included in the DDA data S11 and the (R, G, B, tα) data S17$_1$ to S17$_8$ read from the texture data reading circuit 305 by mutually corresponding elements to generate the (R, G, B, α) data S306$_1$ to S306$_8$.

Then, the (R, G, B, α) data S306$_1$ to S306$_8$ is output as (R, G, B, α) data S12$_1$ to 128 to the memory I/F circuit 13.

Note that, in the case of a full color mode, the texture engine circuit 12 directly uses the (R, G, B, tα) data read from the texture buffer 20. In the case of an index color mode, the texture engine circuit 12 reads a color look-up table (CLUT), prepared in advance, from the texture CLUT buffer 23, transfers and stores the same in the built-in SRAM, and uses the color look-up table to obtain the (R, G, B) data corresponding to the color index read from the texture buffer 20.

Memory I/F Circuit 13

The memory I/F circuit 13 compares the (R, G, B, α) data S12$_1$ to S12$_8$ input from the texture engine circuit 12, namely, z-data corresponding to the pixel data S12, with the z-data stored in the z-buffer 22 and judges whether the image drawn by the input pixel data S12 is positioned closer to the viewing point than the image drawn in the display buffer 21 the previous time. When it is judged that the image drawn by the input pixel data S12 is positioned closer, the memory I/F circuit 13 updates the z-data stored in the buffer 22 by the z-data corresponding to the pixel data S12.

Also, the memory I/F circuit 13, in accordance with need, blends the (R, G, B) data included in the pixel data S12 and the (R, G, B) data already stored in the display buffer 21 by the blending ratio indicated by the α data corresponding to the pixel data S12, that is, α blending. Then, the memory I/F circuit 13 writes the data (R, G, B) after blending to the display buffer 21.

Note that the DRAM 16 is simultaneously accessed by the memory I/F circuit 13 for 16 pixels. Note that the access to the DRAM 17 by the memory I/F circuit 13 may be simultaneously made for, for example, 8 pixels or 32 pixels.

CRT Controller Circuit 14

The CRT controller circuit 14 generates an address for display on a not shown CRT in synchronization with the given horizontal and vertical synchronization signals and outputs a request for reading the display data from the display buffer 21 to the memory I/F circuit 13. In response to this request, the memory I/F circuit 13 reads a certain amount of the display data from the display buffer 21. The CRT controller 14 has a built-in first in first out (FIFO) circuit for storing the display data read from the display buffer 21 and outputs the index value of RGB to the RAMDAC circuit 15 at certain time intervals.

RAMDAC Circuit 15

The RAMDAC circuit 15 stores the R, G, B data corresponding to the respective index values, transfers to the digital/analog (D/A) converter the R, G, B data in a digital form corresponding to the index value of the RGB input from the CRT controller 14, and generates RGB data in an analog form. The RAMDAC circuit 15 outputs the generated R, G, B data to the CRT.

The operation of the three-dimensional computer graphic system 1 will be explained below.

Polygon rendering data S4 is output from the main processor 4 to the DDA set-up circuit 10 via the main bus 6. Variation data S10 indicating the sides of the triangle and the difference in a horizontal direction etc. is generated in the DDA set-up circuit 10.

Namely, dsdx, dtdx, and dqdx as variation in the x direction and dsdy, dtdy, dqdy as variation in the y direction of the (s, t, q) are generated.

Then, the variation data S10 is output from the DDA set-up circuit 10 to the triangle DDA circuit 11.

Next, the triangle DDA circuit 11 generates the linearly interpolated (z, R, G, B, α, s, t, q, F) data for the pixels inside the triangle based on the variation data S10.

Also, the triangle DDA circuit 11 generates one bit of validity bit data indicating whether or not the 8 pixels to be processed in parallel are inside the objective triangle for each of the 8 pixels.

Then, the (x, y) data for the respective pixels, the (z, R, G, B, α, s, t, q, F) data at the coordinates (x, y), the validity bit data $I_1$ to $I_8$ dsdx, dtdx, dqdx, dsdy, dtdy and dqdy, and USIZE and VSIZE as the sizes of width and height of the texture are output as DDA data S11 from the triangle DDA circuit 11 to the texture engine circuit 12.

Next, the representative point determining circuit 301 of the texture engine circuit 12 shown in FIG. 3 determines the representative point in accordance with the flow shown in FIG. 4. The determining point instruction data S301 indicating the determined representative point is output to the stq selecting circuit 302.

Then, the stq selecting circuit 302 selects the (s, t, q) data corresponding to the pixel indicated by the representative point instruction data S301 from among the (s, t, q) data $S11a_1$ to $S11a_8$ for the 8 pixels included in the input DDA data S11 and outputs the same as (s, t, q) data S302 to the reducing rate calculation circuit 304.

Next, the reducing rate calculation circuit 304 uses the (s, t, q) data S302 and the variation data S11c to calculate the reducing rate of the texture data and outputs the reducing rate "lod" to the texture reading circuit 305.

Then, based on the flow shown in FIG. 8, the texture data reading circuit 305 reads the texture data $S17_1$ to $S17_8$ from the texture buffer 20 and outputs the read texture data $S17_1$ to $S17_8$ to the texture blending circuit 306.

Next, the texture blending circuit 306 multiplies the (R, G, B, α) data $S11b_1$ to $S11b_8$ for 8 pixels included in the DDA data S11 and the (R, G, B, tα) data $S17_1$ to $S17_8$ read by the texture data reading circuit 305 with the mutually corresponding elements to generate the (R, G, B, α) data $S306_1$ to $S306_8$.

Then, the α data $S11d_1$ to $S11d_8$ included in the DDA data and the (R, G, B, α) data $S306_1$ to $S306_8$ are output as (R, G, B, 0) data $S12_1$ to $S12_8$, that is, as pixel data S12, to the memory I/F circuit 13.

The memory I/F circuit compares the z-data corresponding to the pixel data S12 input from the texture engine circuit 12 with the z-data stored in the z-buffer 22 and judges whether or not the image drawn by the input pixel data S12 is positioned closer to the viewing point than the image drawn in the display buffer 21 the previous time. When the image drawn by the pixel data S12 is judged to be positioned closer, the z-data stored in the z-buffer 22 is updated by the z-data corresponding to the pixel data S12.

Next, the memory I/F circuit 13, in accordance with need, blends the (R, G, B) data included in the pixel data S12 and the (R, G, B) data already stored in the display buffer 21 by the blending ratio indicated by the α data corresponding to the pixel data S12 and writes the blended (R, G, B) data in the display buffer 21.

As explained above, according to the three-dimensional computer graphic system 1, as shown in FIG. 4, since the representative point is dynamically determined from among the pixels inside the objective triangle in a plurality of pixels to be simultaneously processed based on the validity bit data $I_1$ to $I_8$, the representative point can be determined always inside the triangle.

As a result, the suitable texture data can be selected for the pixels inside the triangle and a high quality picture can be stably provided.

Also, according to the three-dimensional computer graphic system 1, although 8 pixels are simultaneously processed, only one reducing rate calculation circuit 304 need be provided. Therefore, the apparatus does not become large in scale.

The present invention is not limited to the above embodiments.

For example, the number of the pixels to be simultaneously processed was made 8 in the above embodiment, however, the number may be, for example, 4. Note that the number of pixels to be simultaneously processed is preferably a power of 2, however, it may also be, for example, 6.

Also, the processing in the representative point determining circuit 301 shown in FIG. 3 is not limited to the one shown in FIGS. 4 and 5 as far as a pixel inside the triangle is selected as the representative point.

Further, processing in the representative point determining circuit 301 shown in FIG. 3 is not particularly limited to that shown in FIG. 4 and FIG. 5 so long as a pixel positioned inside the unit graphic is selected.

Further, the three-dimensional computer graphic system 1 shown in FIG. 1 was explained with reference to a configuration using the SRAM 17, but it may also be configured without the SRAM 17.

Further, the texture buffer 20 and the texture CLUT buffer 23 shown in FIG. 1 may also be provided outside the DRAM 16.

Further, in the three-dimensional computer graphic system 1 shown in FIG. 1, the geometry processing for generating the polygon rendering data was explained using as an example processing by the main processor 4, but it may also be performed by the rendering circuit 5.

While the invention has been described with reference to specific embodiment chosen for purpose of illustration, it should be apparent that numerous modifications could be made thereto by those skilled in the art without departing from the basic concept and scope of the invention.

What is claimed is:

1. A graphic processing apparatus for expressing a three-dimensional model by a composite of a plurality of unit graphics to which common processing conditions are applied, determining a reducing rate from homogeneous coordinates (s,t) and a homogeneous term q included in image data for each pixel, and establishing correspondence between texture data in accordance with the determined reducing rate and said unit graphics, said graphic processing apparatus comprising:

a storage means for storing a plurality of texture data corresponding to different reducing rates;

a representative point determining means for determining for each of a plurality of pixel blocks, each pixel block at least partially within a unit graphic, a pixel as a representative point among pixels positioned inside the unit graphic, each of the pixels both within a pixel block and within the unit graphic to be simultaneously processed using the representative point, independent of any relationship between the representative point and the pixels;

a reducing rate determining means for determining for each determined representative point, a reducing rate by using said homogeneous coordinates (s, t) and said homogeneous term q corresponding to the determined representative point; and a reading means for reading from said storage means for each determined reducing rate, the texture data specified by the determined reducing rate, said homogeneous coordinates (s, t), and said homogeneous term q for each of said plurality of pixels simultaneously processed.

2. A graphic processing apparatus as set forth in claim 1, wherein only the results of processing for pixels positioned inside of pixels simultaneously processed are used as valid.

3. A graphic processing apparatus as set forth in claim 1, wherein when pixel block has a plurality of pixels positioned inside the unit graphic to be processed among the plurality of pixels simultaneously processed, the pixel closest to the center of a region defined by the plurality of pixels simultaneously processed among the plurality of pixels positioned inside the unit graphic is determined as the representative point.

4. A graphic processing apparatus as set forth in claim 3, wherein the pixel closest to the center of the region is that pixel having the smallest x coordinate and the smallest y coordinate selected from a plurality of pixels around the center of the region.

5. A graphic processing apparatus as set forth in claim 1, wherein the reading means reads the texture data corresponding to a pixel from a physical address determined by a reference address in a storage region of the storage means in accordance with the determined reducing rate and a texture address in accordance with the homogeneous coordinates (s,t) and the homogeneous term q.

6. A graphic processing apparatus as set forth in claim 1, wherein when a pixel block has a single pixel positioned inside the unit graphic, the single pixel is determined as the representative point.

7. A graphic processing apparatus for expressing a three-dimensional model by a composite of a plurality of unit graphics to which common processing conditions are applied and establishing correspondence of texture data showing an image with said unit graphics, said graphic processing comprising:

a storage means for storing a plurality of texture data corresponding to different reducing rates;

a polygon rendering data generating means for generating polygon rendering data including three-dimensional coordinates (x, y, z), red (R) data, green (G) data, blue (B) data, homogeneous coordinates (s, t), and a homogeneous term q for each of the vertexes of said unit graphics;

a data interpolation means for performing interpolation on said polygon rendering data of said vertexes of a unit graphic to generate image data of a pixel positioned inside said unit graphic; and a texture processing means for determining a reducing rate by using the homogeneous coordinates (s, t) and homogeneous term q and establishing correspondence between the texture data in accordance with the determined reducing rate and said unit graphics, said texture processing means comprising:

a representative point determining means for determining for each of a plurality of pixel blocks, each pixel block at least partially within a unit graphic, a pixel as a representative point among pixels positioned inside the unit graphic, each of the pixels both within a pixel block and within the unit graphic to be simultaneously processed using the representative point, independent of any relationship between the representative point and the pixels, a reducing rate determining means for determining for each determined representative point, a reducing rate by using said homogeneous coordinates (s, t) and said homogeneous term q corresponding to the determined representative point; and a reading means for reading from said storage means for each determined reducing rate the texture data specified by the determined reducing rate, said homogeneous coordinates (s, t), and said homogeneous term q for each of said plurality of pixels simultaneously processed.

8. A graphic processing apparatus as set forth in claim 7, further comprising a pixel position judging means for judging, for each pixel block, if each of a plurality of pixels simultaneously processed is positioned inside said unit graphic and generating valid bit data in accordance with the result of the judgment, wherein said representative point determining means of said texture processing means determines the pixel to be said representative point by using said valid bit data.

9. A graphic processing apparatus as set forth in claim 8, wherein when a pixel block has a single pixel having an associated valid bit data indicating the single pixel is positioned inside the unit graphic, the single pixel is determined as the representative point.

10. A graphic processing apparatus as set forth in claim 8, wherein when a pixel block has a plurality of pixels having an associated valid bit data indicating the pixel is positioned inside the unit graphic, that pixel having the smallest x coordinate and the smallest y coordinate selected from a plurality of pixels around the center of the region is determined as the representative point.

11. A graphic processing apparatus as set forth in claim 7, wherein said storage means further stores display data in accordance with the texture data read out by said texture processing means.

12. A graphic processing apparatus for expressing a predetermined shape to be displayed on a display by a combination of unit graphics by simultaneously performing operations for a plurality of pixels and performing processing using as valid only the results of operations on pixels positioned inside a unit graphic to be processed, said graphic processing apparatus comprising:

a polygon rendering data generating apparatus for generating polygon rendering data including three-dimensional coordinates (x, y, z), red (R) data, green (G) data, and blue (B) data, homogeneous coordinates (s, t), and a homogeneous term q for each vertex of said unit graphic;

a rendering apparatus for performing rendering by using said polygon rendering data; and a bus connecting said polygon rendering data generating apparatus and said rendering apparatus;

said rendering apparatus comprising:

a storage means for storing a plurality of texture data corresponding to different reducing rates, a data interpolation means for performing interpolation on polygon rendering data of vertexes of a unit graphic input from said polygon rendering data generating apparatus via said bus to generate image data of a pixel positioned inside said unit graphic, and a texture processing means for determining a reducing rate by using the homogeneous coordinates (s, t) and the homogeneous term q and establishing correspondence of the texture data in accordance with the determined reducing rate with said unit graphics;

said texture processing means comprising:

a representative point determining means for determining for each of a plurality of pixel blocks, each pixel block at least partially within a unit graphic, a pixel as a representative point among pixels positioned inside a unit graphic, each of the pixels both within a pixel block and within the unit graphic to be simultaneously processed using the representative point, independent of any relationship between the representative point and the pixels, a reducing rate determining means for determining for each determined representative point, a reducing rate by using said homogeneous coordinates (s, t) and said homogeneous term q corresponding to the determined representative point, and a reading means for reading from said storage means for each determined reducing rate the texture data specified by the determined reducing rate said homogeneous coordinates (s, t), and said homogeneous term q for each of said plurality of pixels simultaneously processed.

13. A graphic processing method for expressing a three-dimensional model by a composite of a plurality of unit graphics to which common processing conditions are applied, determining a reducing rate by using homogeneous coordinates (s, t) and a homogeneous term q included in image data for each pixel, and establishing correspondence of texture data in accordance with the determined reducing rate with said unit graphics, said method comprising the steps of:

determining for each of a plurality of pixel blocks, each pixel block at least partially within a unit graphic, a pixel as a representative point among pixels positioned inside the unit graphic, each of the pixels both within a pixel block and within the unit graphic to be simultaneously processed using the representative point, independent of any relationship between the representative point and the pixels;

for each determined representative point, determining a reducing rate from said homogeneous coordinates (s, t) and said homogeneous term q corresponding to the determined representative point; and for each determined reducing rate, selecting texture data specified by the determined reducing rate, said homogeneous coordinates (s, t), and said homogeneous term q among a plurality of texture data corresponding to different reducing rates prepared in advance and establishing correspondence of the selected texture data with each of said plurality of pixels simultaneously processed.

14. A graphic processing method as set forth in claim 13 wherein only the results of processing for pixels positioned inside the unit graphic to be processed among the plurality of pixels simultaneously processed are used as valid.

15. A graphic processing method as set forth in claim 13, wherein when a pixel block has a plurality of pixels positioned inside the unit graphic to be processed among the plurality of pixels simultaneously processed, the pixel closest to the center of a region defined by the plurality of pixels simultaneously processed among the plurality of pixels positioned inside the unit graphic is determined as the representative point.

16. A graphic processing method as set forth in claim 15, wherein when a pixel block has a single pixel positioned inside the unit graphic, the single pixel is determined as the representative point.

17. A graphic processing method as set forth in claim 15, wherein the pixel closest to the center of the region is that pixel having the smallest x coordinate and the smallest y coordinate selected from a plurality of pixels around the center of the region.

18. A graphic processing method as set forth in claim 13, further comprising the steps of:

storing a plurality of texture data corresponding to different reducing rates in a storage means and reading the texture data corresponding to a pixel from a physical address determined by a reference address in a storage region of the storage means in accordance with the determined reducing rate and a texture address in accordance with the homogeneous coordinates (s,t) and the homogeneous term q.

19. A graphic processing method for expressing a three-dimensional model by a composite of a plurality of unit graphics to which common processing conditions are applied and establishing correspondence of texture data indicating image with said unit graphics, said method comprising the steps of:

generating polygon rendering data including three-dimensional coordinates (x, y, z), red (R) data, green (G) data, and blue (B) data, homogeneous coordinates (s, t) and a homogeneous term q for each vertex of said unit graphics;

performing interpolation on said polygon rendering data of said vertexes of a unit graphic to generate image data of a pixel positioned inside said unit graphic;

determining for each of a plurality of pixel blocks, each pixel block at least partially within a unit graphic, a pixel as a representative point among pixels positioned inside a unit graphic, each of the pixels both within a pixel block and within the unit graphic to be simultaneously processed using the representative point, independent of any relationship between the representative point and the pixels;

for each determined representative point, determining a reducing rate from said homogeneous coordinates (s, t) and said homogeneous term q corresponding to the determined representative point; and for each determined reducing rate, selecting texture data specified by the determined reducing rate, said homogeneous coordinates (s, t), and said homogeneous term q among a plurality of texture data corresponding to different reducing rates prepared in advance and establishing correspondence of the selected texture data with each of said plurality of pixels simultaneously processed.

* * * * *

UNITED STATES PATENT AND TRADEMARK OFFICE
CERTIFICATE OF CORRECTION

PATENT NO. : 6,624,820 B2
DATED : September 23, 2003
INVENTOR(S) : Hiroyuki Ozawa It is certified that error appears in the above-identified patent and that said Letters Patent is hereby corrected as shown below:

<u>Column 4,</u>
Line 51, change "hit", to read -- bit --.

Signed and Sealed this

Eleventh Day of November, 2003

JAMES E. ROGAN
*Director of the United States Patent and Trademark Office*